US012769617B1

(12) United States Patent
Mayo

(10) Patent No.: US 12,769,617 B1
(45) Date of Patent: Oct. 20, 2026

(54) HOUSEKEEPING OF QUARANTINED CONTAINER INDEXES IN A DEDUPLICATION STORAGE SYSTEM

(71) Applicant: Hewlett Packard Enterprise Development LP, Spring, TX (US)

(72) Inventor: Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 19/249,598

(22) Filed: Jun. 25, 2025

(51) Int. Cl.
*G06F 17/00* (2019.01)
*G06F 11/1446* (2026.01)

(52) U.S. Cl.
CPC ...... *G06F 11/1453* (2013.01); *G06F 2201/80* (2013.01)

(58) Field of Classification Search
CPC .......................... G06F 11/1453; G06F 2201/80
See application file for complete search history.

(56) References Cited

U.S. PATENT DOCUMENTS 8,996,467 B2 * 3/2015 Apte .................. G06F 11/1453 707/741
11,853,576 B2 12/2023 Butt et al.
11,940,956 B2 3/2024 Butt
12,130,707 B2 * 10/2024 Mayo .................. G06F 11/1453
12,130,708 B2 * 10/2024 Chatterjee ........... G06F 11/1451
2021/0073084 A1 * 3/2021 Bourgeois ........... G06F 11/1448
2023/0259488 A1 8/2023 Mayo et al.
2024/0304513 A1 * 9/2024 Lee ...................... H10D 30/014
2024/0311363 A1 * 9/2024 Murray ............... G06F 16/2365

* cited by examiner

*Primary Examiner* — Greta L Robinson
(74) *Attorney, Agent, or Firm* — Trop, Pruner & Hu, P.C.

(57) ABSTRACT

Example implementations relate to deduplication operations in a storage system. An example includes receiving a command to perform housekeeping of a first backup item stored in a persistent storage of a deduplication storage system, and loading a manifest into memory, where the manifest is included in the first backup item. The example also includes loading a container index from the persistent storage into the memory, where the manifest references the container index. The example also includes removing a reference to the manifest from a backreference list in the container index. The example also includes, in response to a determination that the container index is quarantined, determining whether the backreference list in the quarantined container index is empty. The example also includes, in response to a determination that the backreference list in the quarantined container index is empty, deleting the quarantined container index from the persistent storage.

20 Claims, 10 Drawing Sheets

HOUSEKEEPING OF QUARANTINED CONTAINER INDEXES IN A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
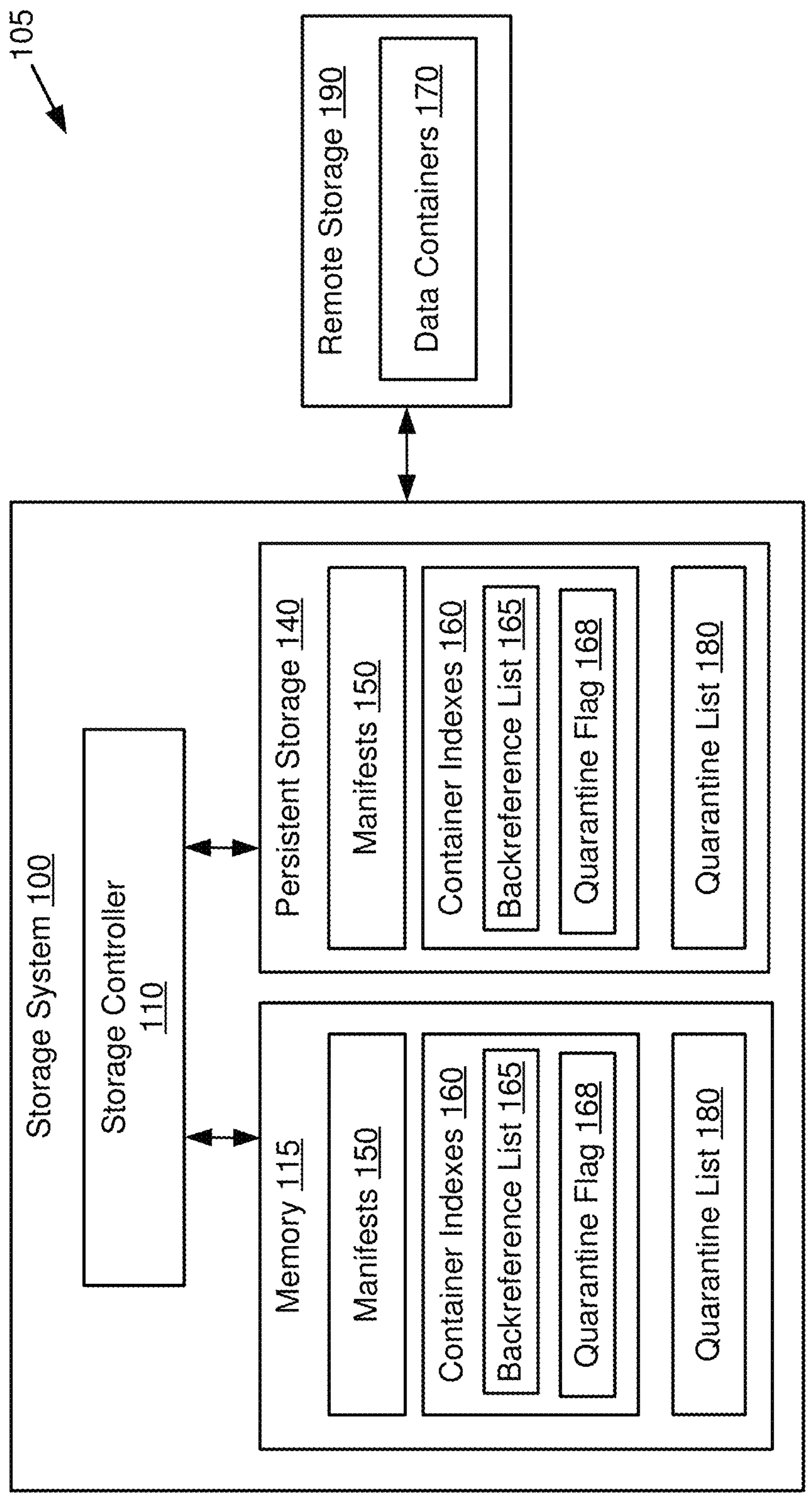
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units. A process for receiving and deduplicating an inbound data stream may be referred to herein as a "data ingest" process of a storage system.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

In some examples, the storage system may backup at least a portion of the data stream in deduplicated form, to thereby reduce the amount of storage space occupied by storage of the data stream. The storage system may create a "backup item" to represent a data stream in a deduplicated form. The storage system may perform a deduplication process including comparing the fingerprints of incoming data units to fingerprints of stored data units, and determining which incoming data units (if any) are duplicates of previously stored data units (e.g., when the comparison indicates matching fingerprints). In the case of data units that are duplicates, the storage system may store references to previously stored data units instead of storing the duplicate incoming data units. A process for receiving and deduplicating an inbound data stream may be referred to herein as a "data ingest" process of a storage system.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a storage system may use metadata structures for processing inbound data streams (e.g., backup items). For example, such metadata structures may include data recipes (also referred to herein as "manifests") that specify the order in which particular data units are received for each backup item. Further, such metadata structures may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the storage system may use the item metadata and the set of manifests to determine the received order of data units, and may thereby recreate the original data stream of the backup item. Accordingly, the set of manifests may be a representation of the original backup item.

In some examples, the manifests may include a sequence of records, with each record representing a particular set of data unit(s). The records of the manifest may include one or more fields that identify container indexes that include metadata for the data units. For example, a container index may include one or more metadata fields that specify fingerprints for the stored data units, storage address information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the storage system. For example, the storage system may compare the fingerprint of the received data unit against the fingerprints in one or more container indexes. As used herein, the term "matching operation" may refer to an operation to compare fingerprints of a collection of multiple data units (e.g., from a particular backup data stream) against fingerprints stored in one or more container indexes. If no matching fingerprints are found in the searched container index(es), the received data unit may be added to a data container, and a metadata entry for the received data unit may be added to an associated container index. However, if a matching fingerprint is found in a searched container index, it may be determined that a data unit identical to the received data unit is already stored in an existing data container. In response to this determination, the reference count of the corresponding entry may be incremented, and the received data unit is not stored in a data container (as it is already present in one of the data containers), thereby avoiding storing a duplicate data unit in the storage system.

In some examples, the deduplication storage system may perform housekeeping tasks to maintain the accuracy of the included metadata. For example, when a data unit is deleted from a given manifest (e.g., due to a change to the data stream or item represented by the manifest), a housekeeping task may include decrementing the reference count for that data unit by one (i.e., indicating that the data unit is referenced by one less manifest). In some examples, when a particular backup item is marked for deletion (e.g., is identified as no longer needed) in the deduplication storage system, a set of housekeeping tasks may be scheduled and performed to delete that backup item. The set of housekeeping tasks may include identifying the manifests included in the backup item, sequentially accessing and loading these manifests into memory, and reading the manifests to determine the container identifiers and address information for the data units in each manifest. The set of housekeeping tasks may also include accessing and loading the container indexes (e.g., using the container identifiers) into memory, decrementing the reference counts for the data units (e.g., using the address information for the data units), and then saving the container indexes to persistent storage.

In some examples, an error may be detected for a container index, thereby indicating that the container index may have missing or incorrect metadata. For example, an error may be detected if a metadata value (e.g., a storage location) in the container index is associated with an invalid operation (e.g., a failed read of a stored data unit). In another example, an error may be detected if a hardware or network system failure occurs during a write of the container index from memory to persistent storage. In some examples, repairing or rebuilding a container index that has suffered an error may involve extensive processing and data transfers, and may therefore be difficult or impractical. However, such a container index may still include at least some metadata that is needed to access the stored data units. Accordingly, the container index may not be deleted, and instead may be maintained in a quarantined state that allows at least some access to the container index. In some examples, the quarantined container index may no longer be used for matching operations (i.e., the fingerprints in the quarantined container index are not compared to fingerprints of incoming data units). Further, the quarantined container index may not be used for cloning operations (i.e., is not used to create a copy of a particular data stream stored in the deduplication storage system by cloning a manifest).

In some examples, the quarantined container indexes may not be included in housekeeping tasks, and therefore may not be deleted by housekeeping. In some situations, the number of quarantined container indexes may become relatively large, and storing the quarantined container indexes may consume a relatively high proportion of storage space. Accordingly, storing the quarantined container indexes may reduce the performance of the deduplication storage system.

In accordance with some implementations of the present disclosure, a controller of a deduplication storage system may perform housekeeping tasks to delete a particular backup item. The housekeeping tasks may include identifying a manifest that is included in the backup item, reading the manifest to identify a container index, and determining whether the container index is quarantined. If the container index is not quarantined (also referred to herein as a "non-quarantined container index"), it may be processed using a standard housekeeping process (e.g., including decrementing reference counts for data units in the manifest, and saving the non-quarantined container index to persistent storage). Otherwise, if the container index is quarantined (also referred to herein as a "quarantined container index"), it may be processed using an alternative housekeeping process (referred to herein as a "quarantine housekeeping process") that is only used for quarantined container indexes. The quarantine housekeeping process may include removing an identifier for the manifest from a backreference list included in the quarantined container index. Subsequently, if the backreference list is empty, the quarantined container index is deleted. In this manner, the controller may perform housekeeping to delete the quarantined container indexes that are no longer referenced by any manifest, and therefore are no longer needed by the storage system. Accordingly, some implementations may reduce the amount of storage needed for quarantined container indexes, and may thereby improve the performance of the storage system. Various aspects of the disclosed housekeeping processes are discussed further below with reference to FIGS. 1-7.

FIG. 1—Example Storage System

FIG. 1 shows an example system 105 that includes a storage system 100 and a remote storage 190. The storage system 100 may include a storage controller 110, memory 115, and persistent storage 140, in accordance with some implementations. The storage system 100 may be coupled to the remote storage 190 via a network connection. The remote storage 190 may be a network-based persistent storage facility or service (also referred to herein as "cloud-based storage"). In some examples, use of the remote storage 190 may incur financial charges that are based on the number of individual transfers.

The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

In some implementations, the memory 115 and the persistent storage 140 may include manifests 150, container indexes 160, and a quarantine list 180. Further, the remote storage 190 may persistently store data containers 170. Each data container 170 may be a container data structure configured to store multiple data units. In some examples, copies of the manifests 150, container indexes 160, and data containers 170 may be transferred between some or all of the memory 115, the persistent storage 140, and the remote storage 190 (e.g., via read and write input/output (I/O) operations).

In some implementations, the storage system 100 may perform deduplication of the stored data. For example, the storage controller 110 may receive a data stream including a sequence of multiple data units. In some examples, each instance of a data stream may represent a unique backup of a collection of data. The storage controller 110 may store at least one copy of each data unit in a data container 170 (e.g., by appending the data units to the end of the data container 170). Further, the storage controller 110 may generate a manifest 150 to record the order in which the data units were received in the data stream. The manifest 150 may include pointers or other information indicating other data structures that include metadata for each data unit. For example, the manifest 150 may include, for each data unit, an identifier for the container index 160 associated with the data unit, a storage location of the data unit (e.g., in a data container 170), and so forth.

In some implementations, when processing an initial instance of a data stream (e.g., during the initial backup of a given backup item), the storage controller 110 may assign a set of container indexes 160 to different localities in the data stream. Further, each container index 160 may store metadata for the data units that are included in its associated locality in the data stream (i.e., the locality to which that container index 160 is assigned). Example implementations of a manifest 150, a container index 160, and data containers 170 are discussed further below with reference to FIG. 2.

In some implementations, the data unit metadata stored in a container index 160 may include fingerprints that identify different received data units. For example, each fingerprint may include a full or partial hash value based on the identified data unit. To determine whether an incoming data unit is a duplicate of a stored data unit, the storage controller 110 may compare the fingerprint generated for the incoming data unit to the fingerprints stored in at least one container index 160. The process of comparing fingerprints of one or more received data units against fingerprints of one or more container indexes 160 may be referred to herein as a "matching operation." If a match is identified for the fingerprint of an incoming data unit, then the storage controller 110 may determine that a duplicate of the incoming data unit is already stored by the storage system 100. The storage controller 110 may then store references to the previous data unit, instead of storing the duplicate incoming data unit. Otherwise, if no match is identified, the storage controller 110 may determine that the incoming data unit is a new data unit (i.e., is not already stored in the data containers 170). The storage controller 110 may then store the new data in a data container 170, and add metadata for the new data unit to a container index 160 that is associated with the data container 170.

In some implementations, prior to attempting to perform matching operations for received data units, the storage controller 110 may identify a particular container index 160 (referred to herein as the "candidate" container index) to use in matching operations for received data unit(s). In some examples, the candidate container index may be identified using a data structure (referred to herein as a "sparse index") that maps a relatively small subset of fingerprints (referred to herein as "hook points") to corresponding container indexes. For example, the hook points of incoming data units may be compared to the hook points in the sparse index, and the container index with the highest number of matching hook points may be identified as the candidate container index. Alternatively, in some implementations, the sparse index may be used to identify a "candidate list" including multiple container indexes (e.g., five container indexes) that have the highest numbers of matching hook points. In such implementations, the candidate list may be used in matching operations for received data unit(s). In some implementations, the sparse index may contain entries for a subset of fingerprints defined by a sparse fingerprint condition. As used herein, the term "hook points" refers to the subset of fingerprints that meet the sparse fingerprint condition. In some examples, the sparse fingerprint condition may be a condition that is met by a relatively small number of all of the possible fingerprints. For example, the sparse fingerprint condition may be whether a given fingerprint (e.g., in a binary representation) includes a particular bit pattern at a particular offset.

In some implementations, the storage controller 110 may generate a backup item to represent each received backup in a deduplicated form. Each backup item may be a metadata structure that includes identifiers for a set of manifests 150, and may indicate the sequential order of the set of manifests 150. The manifests 150 record the order in which the data units were received. Further, the manifests 150 may include a pointer or other information indicating the container index 160 that indexes each data unit. In some implementations, the container index 160 may indicate the location in which the data unit is stored. For example, the container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access a set of manifests 150 (e.g., in a backup item) to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, offsets, etc.), and may then read the data units from the determined locations.

In some implementations, each container index 160 may include a backreference list 165 and a quarantine flag 168. The quarantine flag 168 may be a stored Boolean value (e.g., a bit value, a field, etc.) that indicates whether that container index 160 has been quarantined (e.g., after detecting an error in that container index 160). Further, the quarantine list 180 may be a data structure that identifies all container indexes 160 that have been quarantined in the storage system 100.

In some implementations, the backreference list 165 may be a data structure to store a set of entries, where each entry stores a reference to a different manifest 150 that is indexed by the container index 160. For example, in some implementations, each entry of the backreference list 165 may only store a manifest identifier (i.e., a string or value) that uniquely identifies a particular manifest 150 that references the container index 160 that includes the backreference list 165. Further, in other examples, each entry of the backreference list 165 may include both a manifest identifier and at least one data unit range (e.g., a set of one or more data units that are included in the identified manifest 150 and that are indexed by the container index 160).

In some implementations, the storage controller 110 may perform a housekeeping process to delete a set of manifests 150 (e.g., included in a particular backup item). The storage controller 110 may read a manifest 150 to identify a container index 160, and may determine whether that container index 160 has been quarantined. For example, the storage controller 110 determines that a container index 160 has been quarantined if the quarantine flag 168 is set to a positive value (i.e., indicating that the container index 160 is currently quarantined). In another example, the storage controller 110 determines that a container index 160 is quarantined if an identifier for the container index 160 is included in the quarantine list 160. In yet another example, the storage controller 110 determines that a container index 160 is quarantined if the quarantine flag 168 and the quarantine list 160 both indicate that the container index 160 is quarantined.

In some implementations, if it is determined that the container index 160 is not quarantined, the storage controller 110 may perform a standard housekeeping process for the container index 160. For example, the storage controller 110 may decrement, in the container index 160, the reference counts for any data units that are recorded in the manifest 150. Otherwise, if it is determined the container index 160 is quarantined, the storage controller 110 may perform a quarantine housekeeping process for the quarantined container index 160. For example, the storage controller 110 may remove an identifier for the manifest 150 from the backreference list 165 in the container index 160, and may determine whether the backreference list 165 is empty (i.e., does not include any manifest identifiers). If the backreference list 165 is empty, the storage controller 110 may delete the quarantined container index 160. In this manner, the storage controller 110 may perform housekeeping process to delete quarantined container indexes 160 that are no longer referenced by any manifest 150, and therefore are no longer needed by the storage system 100. Accordingly, some implementations may reduce the amount of storage needed for quarantined container indexes 160, and may thereby improve the performance of the storage system 100. Example implementations of the housekeeping processes are discussed further below with reference to FIGS. 3 and 4A-4E.

Note that, while FIG. 1 shows one example, implementations are not limited in this regard. For example, some implementations may use only the quarantine flag 168 to indicate whether the container index 160 is quarantined. Further, other implementations may use only the quarantine list 180 to indicate whether the container index 160 is quarantined. In another example, it is contemplated that some or all of the manifests 150 and container indexes 160 may be stored in the remote storage 190. In yet another example, it is contemplated that the memory 115, persistent storage 140, and/or remote storage 190 may include other data objects or metadata. Furthermore, it is contemplated that the storage system 100 may include additional devices and/or components, fewer components, different components, different arrangements, and so forth.

Figure 2:
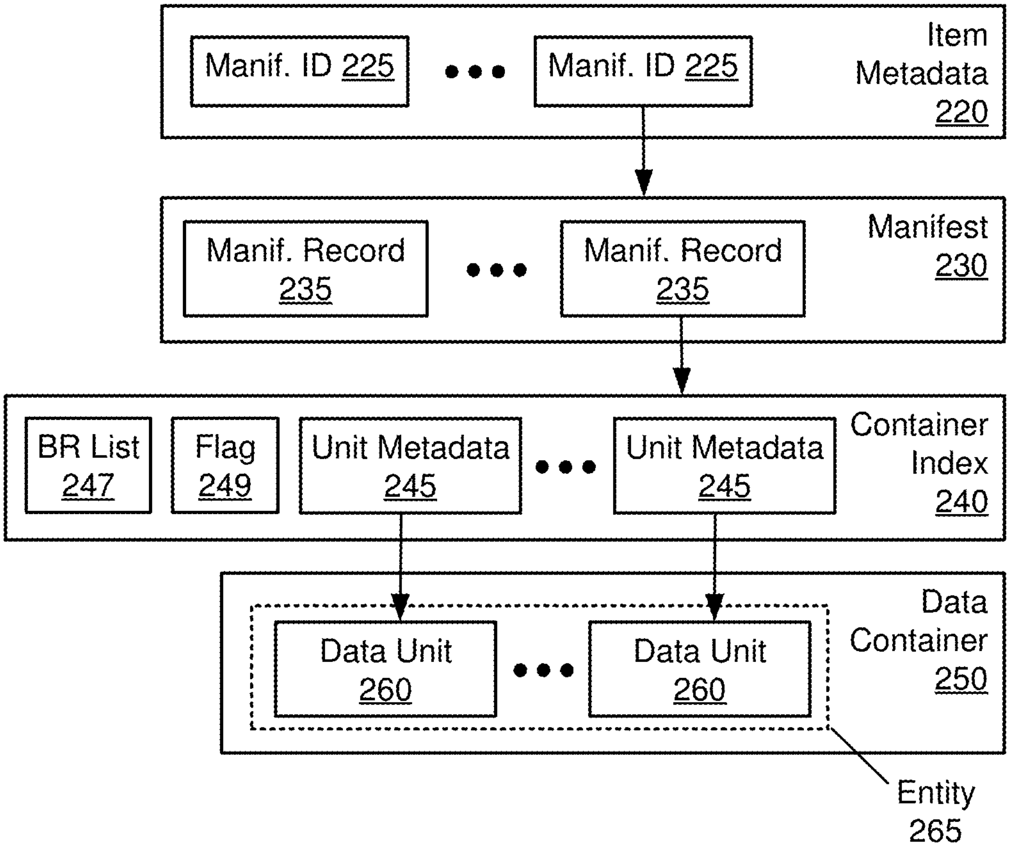
FIG. 2 is an illustration of example data structures, in accordance with some implementations.

FIG. 2—Example Data Structures

FIG. 2 shows an illustration of example data structures used in deduplication, in accordance with some implementations. As shown, the data structures 200 may include item metadata 220, a manifest 230, a container index 240, and a data container 250. In some examples, the manifest 230, the container index 240, and the data container 250 may correspond generally to example implementations of a manifest 150, a container index 160, and a data container 170 (shown in FIG. 1), respectively. Further, in some examples, the data structures 200 may be generated and/or managed by the storage controller 110 (shown in FIG. 1A).

In some implementations, the item metadata 220 may include multiple manifests identifiers 225. Each manifests identifier 225 may identify a different manifest 230. In some implementations, the manifests identifiers 225 may be arranged in a stream order (i.e., based on the order of receipt of the data units represented by the identified manifests 230). Further, although one of each is shown for simplicity of illustration in FIG. 2, data structures 200 may include a plurality of instances of item metadata 220, each including or pointing to one or more manifests 230. In such examples, data structures 200 may include a plurality of manifests 230.

In some implementations, the manifests 230 may include a plurality of manifest entries or "records" 235 that are associated with different data units (e.g., a sequence of data units received in a data stream). For example, each record in the manifest 230 may include a data unit identifier and a data container identifier. The data unit identifier may be a numerical value (referred to as the "arrival number") that indicates the sequential order of arrival (also referred to as the "ingest order") of data units being added to a deduplication storage system (e.g., system 105 shown in FIG. 1). Further, the data container identifier may identify the data container 250 that stores a copy of the data unit.

In some implementations, each container index 240 may include a backreference list ("BR List") 247, a quarantine flag ("Flag") 249, and a plurality of unit metadata 245. The backreference list 247 and the quarantine flag 249 may correspond generally to example implementations of a backreference list 165 and a quarantine flag 168 (shown in FIG. 1), respectively. The backreference list 247 in the container index 240 may be a data structure that records the identifiers of each manifest 230 that references that container index 240. Further, the quarantine flag 249 may be a value that indicates whether the container index 240 is a quarantined container index.

In some implementations, each instance of unit metadata 245 may index one or more data units 260. For example, each instance of unit metadata 245 may include a data unit identifier, a fingerprint, a reference count, a data container identifier, a unit location, and compression information. The fingerprint may be a value derived by applying a function (e.g., a hash function) to all or some of the content of the data unit. The reference count may indicate the total number of records in the manifests 230 that reference the data unit. The compression information may indicate how the stored data unit is compressed or decompressed (whether compression was used, type of compression code, type of decompression code, decompressed size, a checksum value, etc.). In some examples, during a read operation, the compression information may be used to decompress a requested data unit.

In some implementations, the unit location may indicate the portion of (or position within) the data container 250 that stores the data unit 260 (or a set of data units 260). The unit location may be information stored in a field (or in a combination of multiple fields) that deterministically identifies the storage location of the data unit(s) 260. For example, the unit location may be recorded as two values (e.g., stored in two fields) that respectively identify a particular offset in the data container 250, and the data length of the data unit(s) 260 stored at the specified offset. In another example, the unit location may be recorded as a single value (e.g., an offset in the data container 250). Other examples are possible.

Note that, while FIG. 2 shows one example of the data structures 200, implementations are not limited in this regard. For example, it is contemplated that the manifest 230, the container index 240, and the data containers 250 may include additional fields or elements, additional data structures, and so forth.

Figure 3:
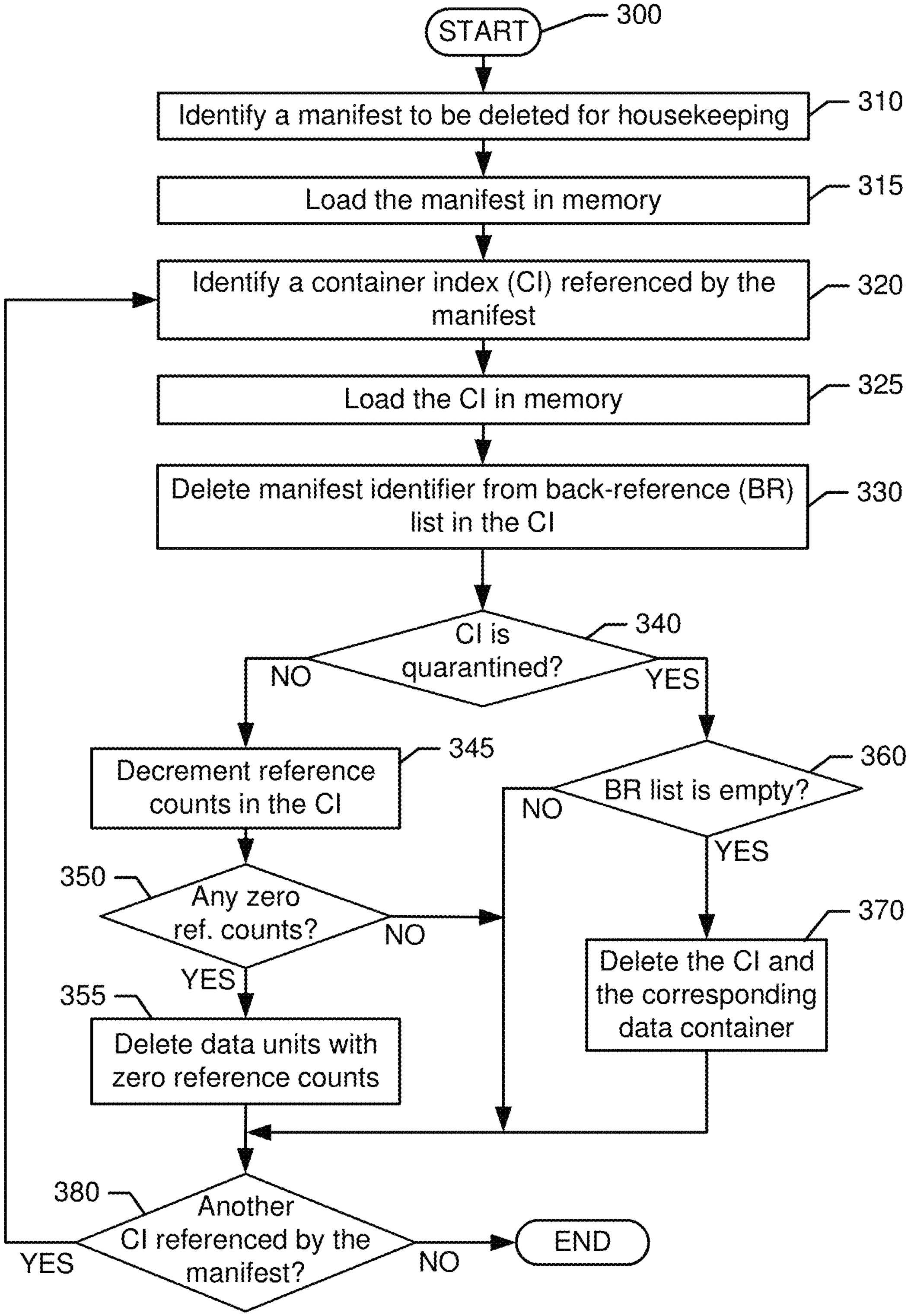
FIG. 3 is an illustration of an example process, in accordance with some implementations.

FIG. 3—Example Process for Housekeeping Data

FIG. 3 shows is an example process 300 for housekeeping data in a deduplication storage system, in accordance with some implementations. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 300 may be executed by a single processing thread. In other implementations, the process 300 may be executed by multiple processing threads in parallel (e.g., concurrently using the work map and executing multiple housekeeping jobs).

As shown in FIG. 3, block 310 may include identifying a particular manifest to be deleted for housekeeping. Block 315 may include loading the particular manifest into memory. Block 320 may include identifying a container index (CI) that is referenced by the particular manifest. Block 325 may include loading the CI into memory. Block 330 may include deleting the manifest identifier from the backreference (BR) list in the CI. Decision block 340 may include determining whether the CI is quarantined.

Figure 4A:
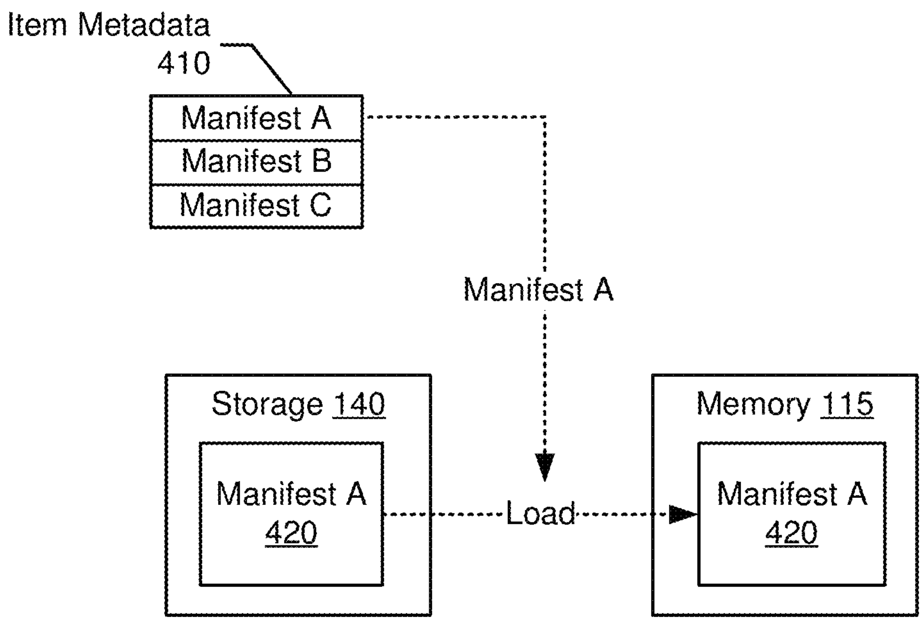
FIGS. 4A-4E are illustrations of example operations, in accordance with some implementations.
Figure 4B:
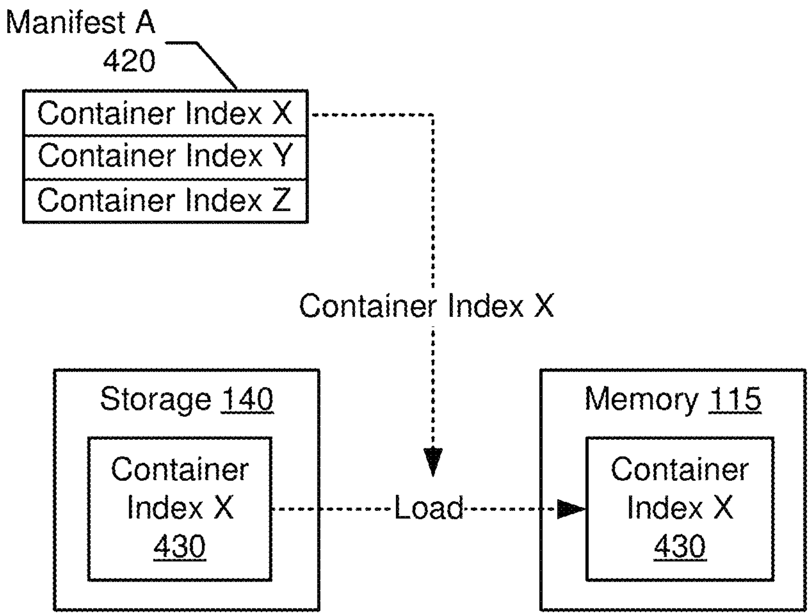
Figure 4C:
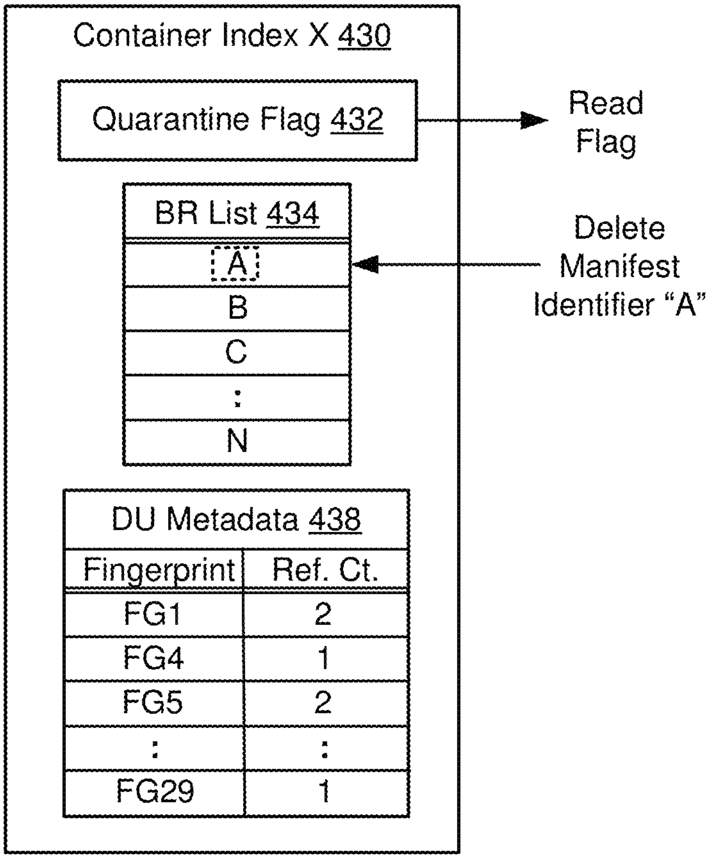

For example, referring to FIG. 4A, a controller (e.g., storage controller 110 shown in FIG. 1) detects a trigger event (e.g., a user command, a program instruction, a scheduled timer, etc.) to cause a deletion or housekeeping of a backup item. In response, the controller reads the item metadata 410 for the backup item, and thereby obtains the identifier for a manifest "A" 420 that is included in the backup item. The controller then loads a copy of the manifest "A" 420 from the persistent storage 140 to the memory 115 (e.g., via a read I/O operation). Referring now to FIG. 4B, the controller reads the manifest "A" 420 to obtain the identifier for a container index "X" 430, then loads a copy of the CI "X" 430 from the persistent storage 140 to the memory 115. Referring now to FIG. 4C, the controller deletes the manifest "A" identifier from the BR list 434. Further, the controller reads the quarantine flag 432 to determine whether the container index "X" 430 is quarantined.

Referring again to FIG. 3, if it is determined at decision block 340 that the CI is not quarantined ("NO"), the process 300 may continue at block 345, including decrementing reference counts in the non-quarantined CI. Decision block 350 may include determining whether any data unit has a reference count equal to zero (also referred to herein as having a "zero reference count") in the non-quarantined CI. If it is determined at decision block 350 that one or more data units have zero reference counts in the CI ("YES"), the process 300 may continue at block 355, including deleting the one or more data units with zero reference counts. After block 355, the process 300 may continue at decision block 380 (described below).

Figure 4D:
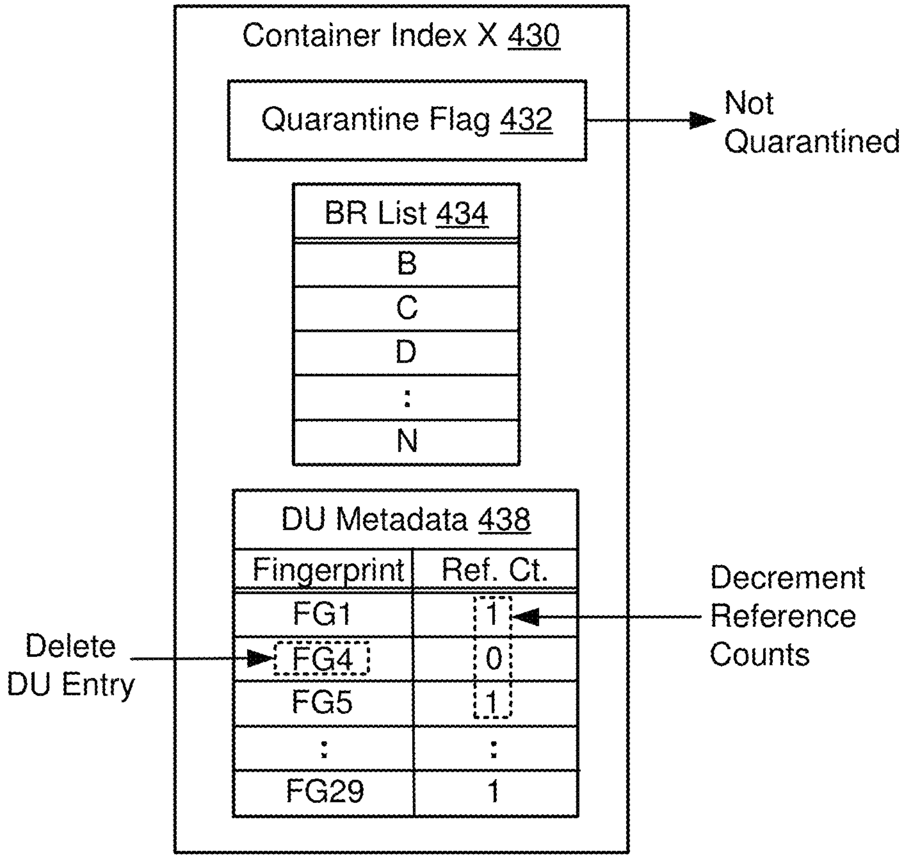

For example, referring to FIG. 4D, the controller determines that the quarantine flag 432 is set to a negative value (e.g., "False"), thereby indicating that the container index "X" 430 is not quarantined. In response to this determination, the controller performs a standard housekeeping process, including determining that three data units (e.g., represented by fingerprints FG1, FG4, and FG5) are recorded in the manifest "A" 420 and are indexed by the non-quarantined container index "X" 430. The controller decrements the reference counts (in the data unit metadata 438) that represent the identified three data units, thereby indicating that the three data units are no longer referenced by the manifest "A" 420 that is to be deleted. Further, the controller determines that the reference count for fingerprint FG4 is zero (i.e., indicating that the corresponding data unit is no longer referenced by any manifests), and in response deletes the FG4 entry (i.e., the metadata entry for the data unit identified by fingerprint FG4) in the data unit metadata 438. In some implementations, the controller subsequently writes the non-quarantined container index "X" 430 from memory to persistent storage. Furthermore, in some implementations, the controller also deletes the stored data unit that is represented by fingerprint FG4. For example, the controller may load the data container that stores the data unit into memory, and may delete the data unit from the data container (not shown in FIG. 4D).

Referring again to FIG. 3, if it is determined at decision block 340 that the CI is quarantined ("YES"), the process 300 may continue at decision block 360, including determining whether the backreference (BR) list in the quarantined CI is empty (i.e., does not include any manifest identifiers). If it is determined at decision block 360 that the BR list is empty ("YES"), the process 300 may continue at block 370, including deleting the quarantined CI and the corresponding data container. After block 370, or if it is determined at decision block 360 that the BR list is not empty ("NO"), the process 300 may continue at decision block 380, including determining whether another unprocessed CI (i.e., a CI that has not yet been processed using the process 300) is referenced by the particular manifest. If it is determined at decision block 380 that another unprocessed CI is referenced by the particular manifest ("YES"), the process 300 may return to block 320 (i.e., to identify another CI that is referenced by the particular manifest). Otherwise, if it is determined at decision block 380 that no more unprocessed CIs are referenced by the particular manifest ("NO"), the process 300 may be completed.

Figure 4E:
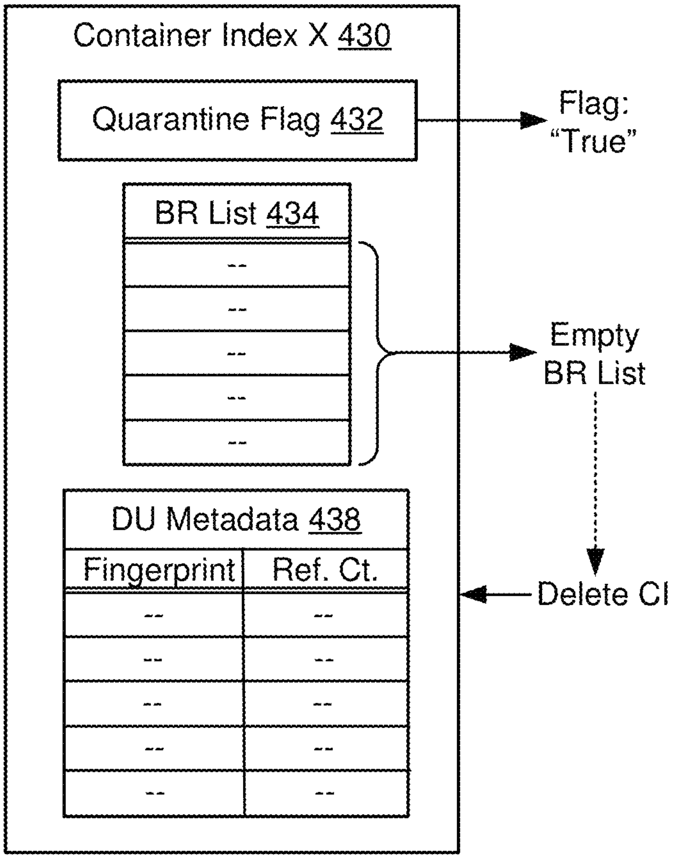

For example, referring to FIG. 4E, the controller determines that the quarantine flag 432 is set to a positive value (e.g., "True"), thereby indicating that the container index "X" 430 is quarantined. In response to this determination, the controller performs a quarantine housekeeping process, including determining whether the BR list 434 is empty. In the example shown in FIG. 4E, the controller determines that the BR list 434 is empty, thereby indicating that the quarantined container index "X" 430 is no longer referenced by any manifests. In response to this determination, the controller deletes the quarantined container index "X" 430. In this manner, the controller reduces the use of persistent storage in the deduplication storage system. In another example (not shown in FIG. 4E), if the controller determines that the BR list 434 is not empty, the controller then writes the quarantined container index "X" 430 from memory to persistent storage.

Figure 5:
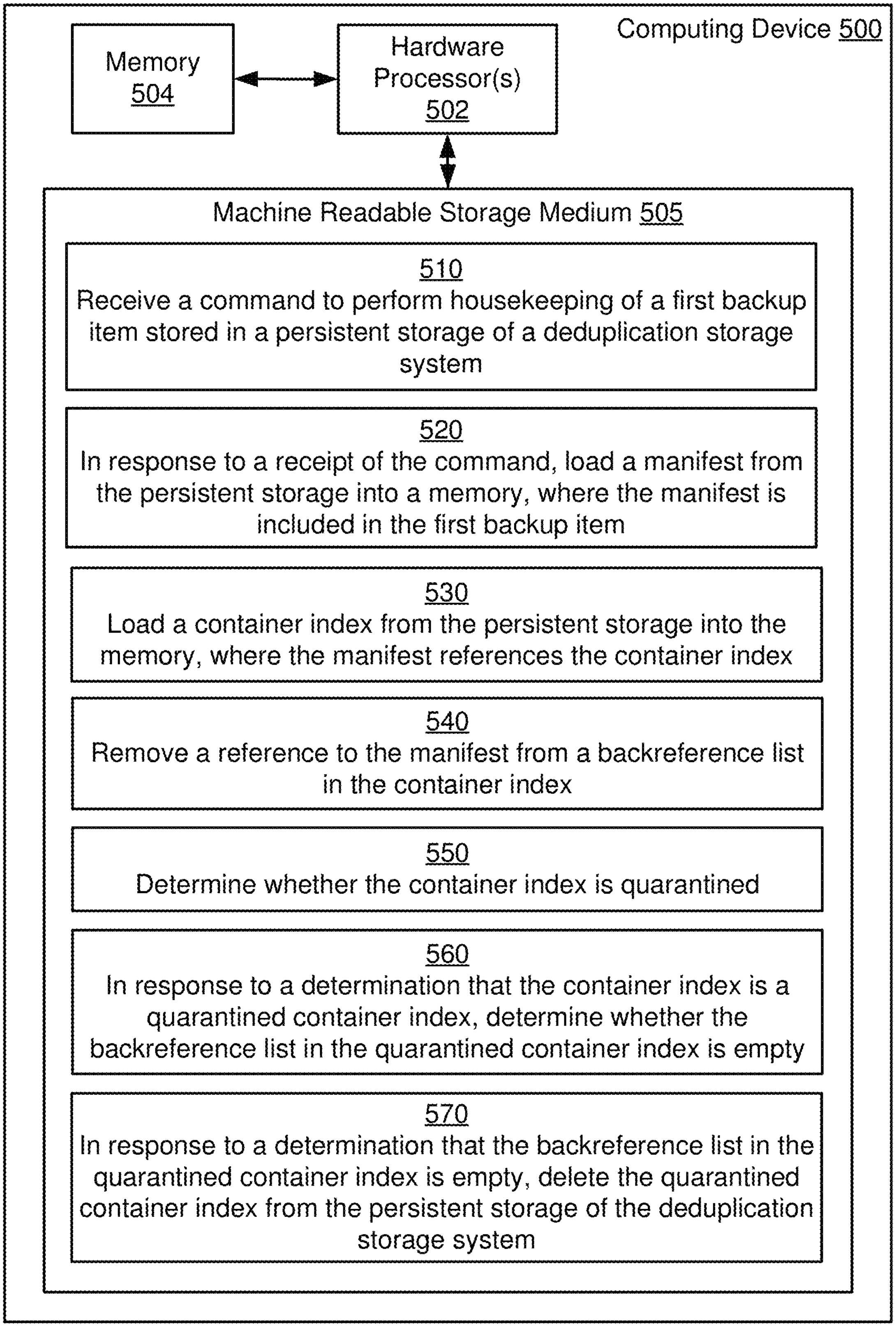
FIG. 5 is a schematic diagram of an example computing device, in accordance with some implementations.

FIG. 5—Example Computing Device

FIG. 5 shows a schematic diagram of an example computing device 500. In some examples, the computing device 500 may correspond generally to some or all of the storage system 100 (shown in FIG. 1). As shown, the computing device 500 may include a hardware processor 502, memory 504, and machine-readable storage 505 including instructions 510-570. The machine-readable storage 505 may be a non-transitory medium. The instructions 510-570 may be executed by the hardware processor 502, or by a processing engine included in hardware processor 502.

Instruction 510 may be executed to receive a command to perform housekeeping of a first backup item stored in persistent storage of a deduplication storage system. Instruction 520 may be executed to, in response to receipt of the command, load a manifest from the persistent storage into the memory, where the manifest is included in the first backup item. Instruction 530 may be executed to load a container index from the persistent storage into the memory, where the manifest references the container index. Instruction 540 may be executed to remove a reference to the manifest from a backreference list in the container index. Instruction 550 may be executed to determine whether the container index is quarantined.

For example, referring to FIG. 4A, a controller (e.g., storage controller 110 shown in FIG. 1) receives a command (or other communication) to delete a backup item during a housekeeping operation. In response, the controller reads the item metadata 410 for the backup item, and thereby obtains the identifier for a manifest "A" 420 that is included in the backup item. The controller then loads a copy of the manifest "A" 420 from the persistent storage 140 to the memory 115. Referring now to FIG. 4B, the controller reads the manifest "A" 420 to obtain the identifier for a container index "X" 430, then loads a copy of the CI "X" 430 from the persistent storage 140 to the memory 115. Referring now to FIG. 4C, the controller deletes the manifest "A" identifier from the BR list 434. Further, the controller reads the quarantine flag 432 to determine whether the container index "X" 430 is quarantined.

Referring again to FIG. 5, instruction 560 may be executed to, in response to a determination that the container index is a quarantined container index, determine whether the backreference list in the quarantined container index is empty. Instruction 570 may be executed to, in response to a determination that the backreference list in the quarantined container index is empty, delete the quarantined container index from the persistent storage of the deduplication storage system.

For example, referring to FIG. 4E, the controller determines that the quarantine flag 432 indicates that the container index "X" 430 is quarantined. In response to this determination, the controller performs a quarantine housekeeping process, including determining whether the BR list 434 is empty. In the example shown in FIG. 4E, the controller determines that the BR list 434 is empty, thereby indicating that the quarantined container index "X" 430 is no longer referenced by any manifests. In response to this determination, the controller deletes the quarantined container index "X" 430.

Referring now to FIG. 4D, in a different example, the controller determines that the quarantine flag 432 indicates that the container index "X" 430 is not quarantined. In response to this determination, the controller performs a standard housekeeping process. For example, the controller determines that three data units (e.g., represented by fingerprints FG1, FG4, and FG5) are recorded in the manifest "A" 420 and are indexed by the non-quarantined container index "X" 430. The controller decrements the reference counts (in the data unit metadata 438) that represent the identified three data units, thereby indicating that the three data units are no longer referenced by the manifest "A" 420 that is to be deleted. Further, the controller determines that the reference count for fingerprint FG4 is zero (i.e., indicating that the corresponding data unit is no longer referenced by any manifests), and in response deletes the FG4 entry in the data unit metadata 438 (i.e., the metadata entry for the data unit represented by fingerprint FG4).

Figure 6:
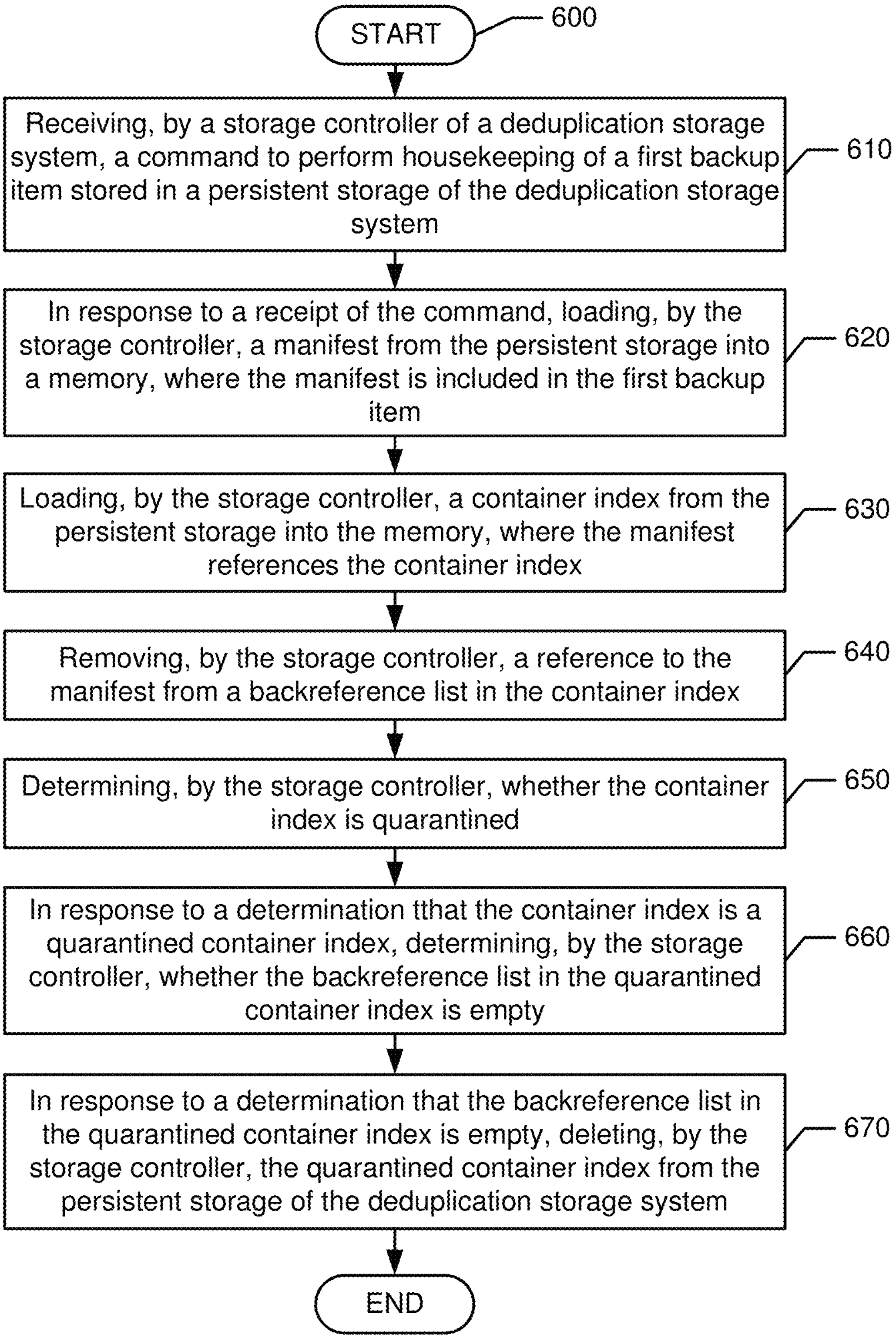
FIG. 6 is an illustration of an example process, in accordance with some implementations.

FIG. 6—Example Process for Housekeeping

FIG. 6 shows is an example process 600 for housekeeping data, in accordance with some implementations. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include receiving, by a storage controller of a deduplication storage system, a command to perform housekeeping of a first backup item stored in a persistent storage of the deduplication storage system. Block 620 may include, in response to a receipt of the command, loading, by the storage controller, a manifest from the persistent storage into a memory, where the manifest is included in the first backup item. Block 630 may include loading, by the storage controller, a container index from the persistent storage into the memory, where the manifest references the container index. Block 640 may include removing, by the storage controller, a reference to the manifest from a backreference list in the container index.

Block 650 may include determining, by the storage controller, whether the container index is quarantined. Block 660 may include, in response to a determination that the container index is a quarantined container index, determining, by the storage controller, whether the backreference list in the quarantined container index is empty. Block 670 may include, in response to a determination that the backreference list in the quarantined container index is empty, deleting, by the storage controller, the quarantined container index from the persistent storage of the deduplication storage system. Blocks 610-670 may correspond generally to the examples described above with reference to instructions 510-570 (shown in FIG. 5).

Figure 7:
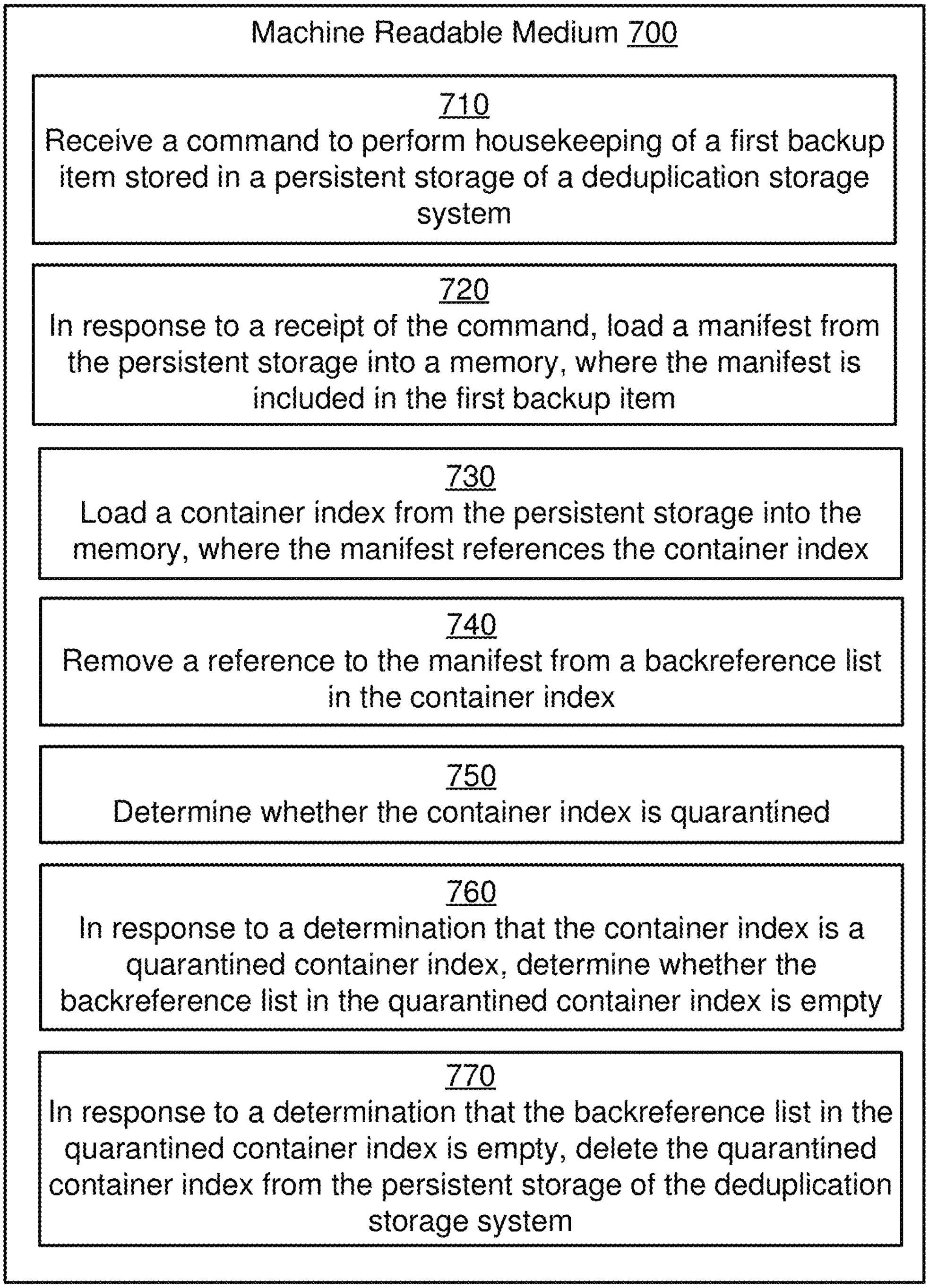
FIG. 7 is a diagram of an example machine-readable medium storing instructions in accordance with some implementations.

FIG. 7—Example Machine-Readable Medium

FIG. 7 shows a machine-readable medium 700 storing instructions 710-770, in accordance with some implementations. The instructions 710-770 can be executed by a single processor, multiple processors, a single processing engine, multiple processing engines, and so forth. The machine-readable medium 700 may be a non-transitory storage medium, such as an optical, semiconductor, or magnetic storage medium. The instructions 710-770 may correspond generally to the examples described above with reference to instructions 510-570 (shown in FIG. 5).

Instruction 710 may be executed to receive a command to perform housekeeping of a first backup item stored in a persistent storage of a deduplication storage system. Instruction 720 may be executed to, in response to a receipt of the command, load a manifest from the persistent storage into a memory, where the manifest is included in the first backup item. Instruction 730 may be executed to load a container index from the persistent storage into the memory, where the manifest references the container index. Instruction 740 may be executed to remove a reference to the manifest from a backreference list in the container index.

Instruction 750 may be executed to determine whether the container index is quarantined. Instruction 760 may be executed to, in response to a determination that the container index is a quarantined container index, determine whether the backreference list in the quarantined container index is empty. Instruction 770 may be executed to, in response to a determination that the backreference list in the quarantined container index is empty, delete the quarantined container index from the persistent storage of the deduplication storage system.

CONCLUSION

In accordance with some implementations of the present disclosure, a controller of a deduplication storage system may perform housekeeping tasks to delete a particular backup item. The housekeeping tasks may include identifying a manifest that is included in the backup item, reading the manifest to identify a container index, and determining whether the container index is quarantined. If the container index is not quarantined, it may be processed using a standard housekeeping process. Otherwise, if the container index is quarantined, it may be processed using quarantine housekeeping process that is only used for quarantined container indexes. The quarantine housekeeping process may include removing an identifier for the manifest from a backreference list included in the quarantined container index. Subsequently, if the backreference list is empty, the quarantined container index is deleted. In this manner, the controller may perform housekeeping to delete the quarantined container indexes that are no longer referenced by any manifest, and therefore are no longer needed by the storage system. Accordingly, some implementations may reduce the amount of storage needed for quarantined container indexes, and may thereby improve the performance of the storage system.

Note that, while FIGS. 1-7 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:

a processor;

memory; and a machine-readable storage storing instructions, the instructions executable by the processor to:

receive a command to perform housekeeping of a first backup item stored in persistent storage of a deduplication storage system;

in response to receipt of the command, load a manifest from the persistent storage into the memory, wherein the manifest is included in the first backup item;

load a container index from the persistent storage into the memory, wherein the manifest references the container index;

remove a reference to the manifest from a backreference list in the container index;

determine whether the container index is quarantined;

in response to a determination that the container index is a quarantined container index, determine whether the backreference list in the quarantined container index is empty; and in response to a determination that the backreference list in the quarantined container index is empty, delete the quarantined container index from the persistent storage of the deduplication storage system.

2. The computing device of claim 1, including instructions executable by the processor to, in response to a determination that the container index is a non-quarantined container index:

decrement, in the non-quarantined container index, a set of reference counts for a set of data units included in the manifest.

3. The computing device of claim 2, including instructions executable by the processor to, after decrementing the set of reference counts in the non-quarantined container index:

determine whether any reference counts in the non-quarantined container index are equal to zero; and in response to a determination that at least one entry in the non-quarantined container index includes a reference count equal to zero, delete the at least one entry in the non-quarantined container index.

4. The computing device of claim 3, including instructions executable by the processor to, after deleting the at least one entry in the non-quarantined container index:

write the non-quarantined container index from the memory to the persistent storage of the deduplication storage system.

5. The computing device of claim 1, including instructions executable by the processor to:

determine whether the container index is quarantined based on a quarantine flag included in the container index.

6. The computing device of claim 1, including instructions executable by the processor to:

determine whether the container index is quarantined based on a stored quarantine list that identifies all quarantined container indexes in the deduplication storage system.

7. The computing device of claim 1, including instructions executable by the processor to, in response to a determination that the backreference list in the quarantined container index is not empty:

write the quarantined container index from the memory to the persistent storage of the deduplication storage system.

8. A method comprising:

receiving, by a storage controller of a deduplication storage system, a command to perform housekeeping of a first backup item stored in a persistent storage of the deduplication storage system;

in response to a receipt of the command, loading, by the storage controller, a manifest from the persistent storage into a memory, wherein the manifest is included in the first backup item;

loading, by the storage controller, a container index from the persistent storage into the memory, wherein the manifest references the container index;

removing, by the storage controller, a reference to the manifest from a backreference list in the container index;

determining, by the storage controller, whether the container index is quarantined;

in response to a determination that the container index is a quarantined container index, determining, by the storage controller, whether the backreference list in the quarantined container index is empty; and in response to a determination that the backreference list in the quarantined container index is empty, deleting, by the storage controller, the quarantined container index from the persistent storage of the deduplication storage system.

9. The method of claim 8 comprising, in response to a determination that the container index is a non-quarantined container index:

decrementing, in the non-quarantined container index, a set of reference counts for a set of data units included in the manifest.

10. The method of claim 9 comprising, after decrementing the set of reference counts in the non-quarantined container index:

determining whether any reference counts in the non-quarantined container index are equal to zero; and in response to a determination that at least one entry in the non-quarantined container index includes a reference count equal to zero, deleting the at least one entry in the non-quarantined container index.

11. The method of claim 10 comprising, after deleting the at least one entry in the non-quarantined container index:

writing the non-quarantined container index from the memory to the persistent storage of the deduplication storage system.

12. The method of claim 8 comprising:

determining whether the container index has been quarantined based on a quarantine flag included in the container index.

13. The method of claim 8 comprising:

determining whether the container index has been quarantined based on a stored quarantine list that identifies all quarantined container indexes in the deduplication storage system.

14. The method of claim 11 comprising, in response to a determination that the backreference list in the quarantined container index is not empty:

writing the quarantined container index from the memory to the persistent storage of the deduplication storage system.

15. A non-transitory machine-readable medium storing instructions that upon execution cause a processor to:

receive a command to perform housekeeping of a first backup item stored in a persistent storage of a deduplication storage system;

in response to a receipt of the command, load a manifest from the persistent storage into a memory, wherein the manifest is included in the first backup item;

load a container index from the persistent storage into the memory, wherein the manifest references the container index;

remove a reference to the manifest from a backreference list in the container index;

determine whether the container index is quarantined;

in response to a determination that the container index is a quarantined container index, determine whether the backreference list in the quarantined container index is empty; and in response to a determination that the backreference list in the quarantined container index is empty, delete the quarantined container index from the persistent storage of the deduplication storage system.

16. The non-transitory machine-readable medium of claim 15, including instructions that upon execution cause the processor to, in response to a determination that the container index is a non-quarantined container index:

decrement, in the non-quarantined container index, a set of reference counts for a set of data units included in the manifest.

17. The non-transitory machine-readable medium of claim 16, including instructions executable by the processor to, after decrementing the set of reference counts in the non-quarantined container index:

determine whether any reference counts in the non-quarantined container index are equal to zero; and in response to a determination that at least one entry in the non-quarantined container index includes a reference count equal to zero, delete the at least one entry in the non-quarantined container index.

18. The non-transitory machine-readable medium of claim 17, including instructions executable by the processor to, after deleting the at least one entry in the non-quarantined container index:

write the non-quarantined container index from the memory to the persistent storage of the deduplication storage system.

19. The non-transitory machine-readable medium of claim 15, including instructions executable by the processor to:

determine whether the container index has been quarantined based on at least one of:

a quarantine flag included in the container index; and a stored quarantine list that identifies all quarantined container indexes in the deduplication storage system.

20. The non-transitory machine-readable medium of claim 15, in response to a determination that the backreference list in the quarantined container index is not empty:

write the quarantined container index from the memory to the persistent storage of the deduplication storage system.

* * * * *